Figure 3:
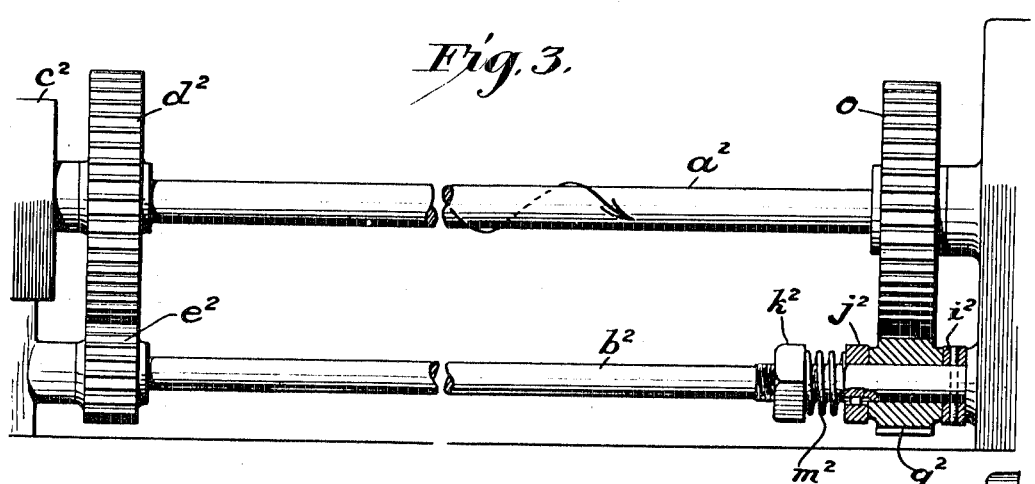

L. H. VOLD.
MEANS FOR ELIMINATING VIBRATIONS IN ROTARY SHAFTS.
APPLICATION FILED NOV. 22, 1913.

1,107,731.

Patented Aug. 18, 1914.

WITNESSES:

INVENTOR
Lars H. Vold
BY
Frank S. Busser
ATTORNEY.

UNITED STATES PATENT OFFICE.

LARS H. VOLD, OF WESTVILLE, NEW JERSEY, ASSIGNOR TO WILLIAM SELLERS & COMPANY, INCORPORATED, OF PHILADELPHIA, PENNSYLVANIA, A CORPORATION OF PENNSYLVANIA.

MEANS FOR ELIMINATING VIBRATIONS IN ROTARY SHAFTS.

1,107,731. Specification of Letters Patent. Patented Aug. 18, 1914.

Application filed November 22, 1913. Serial No. 802,374.

*To all whom it may concern:*

Be it known that I, LARS H. VOLD, a citizen of the United States, residing at Westville, county of Gloucester, and State of New Jersey, have invented a new and useful Improvement in Means for Eliminating Vibrations in Rotary Shafts, of which the following is a full, clear, and exact description, reference being had to the accompanying drawings, which form a part of this specification.

It is well known that trains of gearing, driven by relatively long shafts, may acquire an objectionable vibration, especially when the strains transmitted are considerable. This usually occurs at slow speeds, even when the stresses transmitted by the shafts are well within safe limits. The cause and nature of this vibration may be explained as follows: In the case of a relatively long shaft driven at one end at a uniform velocity and driving at the other end a train of mechanism subjected to sufficient strains to twist the shaft, the shaft will twist until the resistance is greater that the stress, when the shaft will untwist, taking up lost motion in the gearing and giving a sudden impulse to the latter. This operation of twisting and untwisting is constantly repeated, thus establishing a series of impulses or jerks which produce or constitute the objectionable vibration specified. With any given arrangement there are several factors which influence the result: the length of the shaft, the friction of the shaft and mechanism, the moment of inertia of the driven member, and the speed of rotation. There are cases where there is no vibration at a high speed, but excessive vibration at very low speeds. In fact, with any such train, it is possible to establish these vibrations by varying any of the factors mentioned. The tendency to the production of vibrations is not reduced by the provision of an ordinary fixed fly wheel, as would be the case if the rotary motion of the prime mover were irregular. The factors tending to produce the vibrations which it is the object of my invention to prevent presuppose a uniform velocity in the prime mover, in which case the addition of a fly wheel fixedly secured to the shaft at the point where the power is taken off actually increases the tendency to vibration, for it increases the moment of inertia at the driving end.

The nature of the invention will best be understood by reference to the accompanying drawings illustrating two embodiments of my invention, which differ one from the other in specific detail but which contain the same generic features characteristic of my invention.

Figure 1:
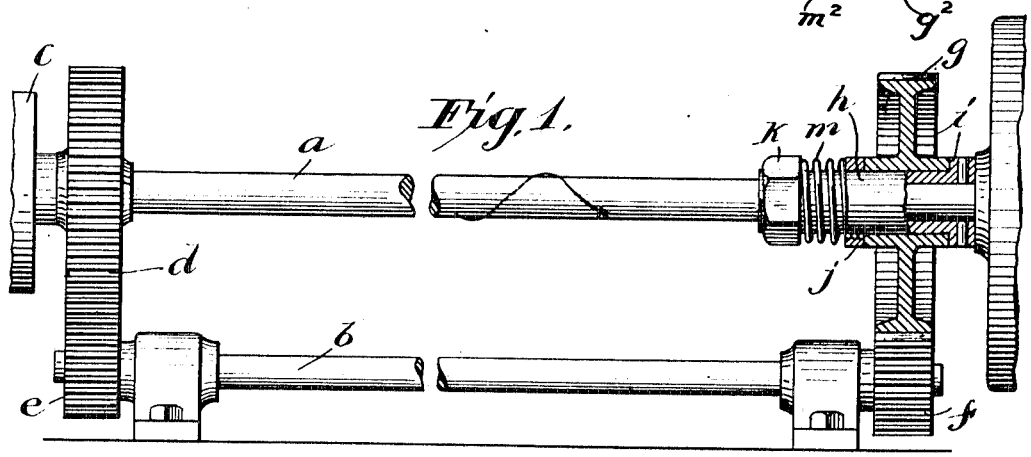
Figure 2:
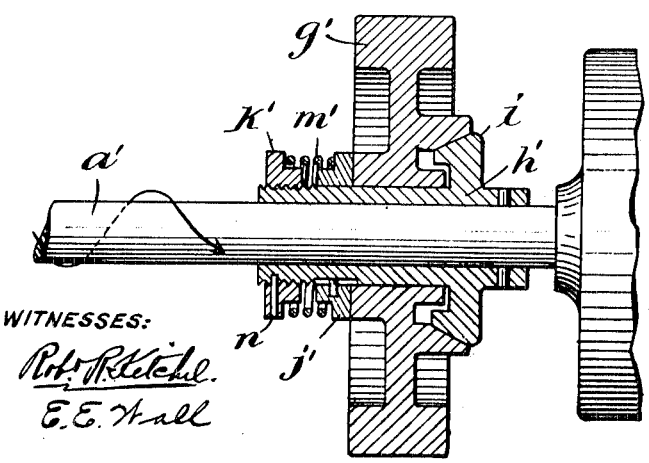

Figure 1 is a side elevation partly in section of one embodiment of my invention. Fig. 2 is a similar view of another embodiment of my invention. Fig. 3 is a similar view of a third embodiment of my invention.

Referring first to Fig. 1: The main driving shaft $a$ is driven from a prime mover $c$ operating at a uniform velocity. This shaft, therefore, rotates at a velocity which is uniform except for the appreciable torsional deflection to which it is subject and which tends to establish vibrations. Another shaft $b$, driven from the same source, rotates at a uniform velocity. In the drawings this shaft is shown as geared to the shaft $a$, by means of toothed wheels $d$ and $e$ arranged at the end of the shaft $a$ adjacent to the prime mover. The two shafts are also geared together, at a point near the point at which the shaft $a$ connects with the driven mechanism, by means of the toothed wheels $f$ and $g$, the former being secured to the shaft $b$, and the latter turning loosely on a hub or sleeve $h$ secured positively to the shaft, and at one end frictionally engaging a member $i$ which, as shown, may be merely an enlargement of the hub $h$, and at the other end frictionally engaging a collar $j$ keyed to the hub $h$ to prevent rotation but with provision for free movement axially of the shaft $a$. An adjustable nut $k$ is threaded on the end of the sleeve $h$ and a spring $m$ is coiled around the sleeve $h$ and confined between the collar $j$ and the nut $k$. By turning nut $k$ the tension of spring $m$ may be adjusted to produce the desired amount of friction. The gearing is such that the shaft $a$ and the wheel $g$ rotate at the same normal or average velocity which, in the case of the wheel $g$, is constant because the velocity of the prime mover is constant and no work sufficient to produce a variation of speed is thrown upon the shaft $b$. Any tendency of the shaft $a$ to run either faster or slower than normal is at once checked by the member $g$ acting through the frictional surface of the members $i$ and $j$, thereby eliminating those oscillations or vibrations which are objectionable.

Instead of positively driving the member $g$, the same may be formed as a fly wheel connected by friction with the shaft subject to oscillation, and whose inertia may be relied upon to prevent or minimize the objectionable vibrations. A modification embodying this principle is shown in Fig. 2, in which the driving shaft is represented by $a'$. A fly wheel member $g'$ runs loosely on the hub $h'$ of a member $i'$ having a cone-shaped driving face frictionally engaging a cone-shaped driving face at one side of the fly wheel member $g'$. At the other side the member $g'$ frictionally engages a collar $j'$ keyed to the hub $h'$ to prevent rotation but with provision for free end movement. The hub $h'$ is threaded to receive a nut $k'$, and a spring $m'$ is coiled around the hub $h'$ and is confined between the collar $j'$ and the nut $k'$. The nut may be secured in its adjusted position by means of a pin $n$. With this construction the member $g'$ takes the uniform speed of the shaft and by its inertia, acting through the friction drive, checks any tendency of the shaft to run either faster or slower than normal.

Instead of arranging the rotary element having a constant velocity concentrically to the shaft subject to oscillation, I may place such rotary element in a different position and relation, as, for instance, on an axis parallel to such shaft and connect the two members by gearing or other connections constraining them to travel at the same speed. Such an arrangement is shown in Fig. 3, in which the main driving shaft $a^2$, driven from a prime mover $c^2$, is geared, by means of toothed wheels $d^2$ and $e^2$, with a shaft $b^2$ arranged parallel to the main shaft. The prime mover rotating at a uniform velocity, the shaft $b^2$ necessarily rotates at a uniform velocity. The two shafts are also geared together, near the point at which the shaft $a^2$ connects with the driven mechanism, by means of toothed wheels $g^2$ and $o$, the latter being secured to the shaft $a^2$ and the former sleeved loosely on the shaft $b^2$. The hub of wheel $g^2$ at one end frictionally engages a collar $i^2$ secured the shaft $b^2$. The hub of wheel $g^2$ at one end frictionally engages a coller $i^2$ secured to the shaft $b^2$, and at the other end frictionally engages a collar $j^2$ keyed to the shaft $b^2$ to prevent rotation but with provision for free end movement axially of the shaft $b^2$. An adjustable nut $k^2$ is threaded on the shaft $b^2$, and a spring $m^2$ is coiled around the shaft $b^2$ and confined between the collar $j^2$ and the nut $k^2$. By turning nut $k^2$ the tension of spring $m^2$ may be adjusted to produce the desired amount of friction. The members $j^2$ and $i^2$, like the shaft $b^2$, necessarily rotate at a constant velocity. Any tendency of the wheel $g^2$ (which is positively geared, through the main driving shaft $a^2$, with the driven mechanism), to run either faster or slower than normal is at once checked by the members $i^2$ and $j^2$ acting through their frictional surfaces.

While in the several specific embodiments of my invention herein set forth I have shown means for varying the amount of friction in the frictional connection between the driven shaft or member and the member rotatable at a constant velocity, it will be understood that friction adjusting means is not indispensable, but may be dispensed with if the construction is correctly designed to produce the desired amount of friction. My invention, therefore, is not limited to an adjustable frictional connection. Capacity to vary the friction, however, is of importance where, after the contrivance is applied to the driven shaft or member, it is found that the friction is greater or less than it should be, or in case of some change in the factors tending to produce vibration which would make it necessary to increase or diminish the friction in order to get the best results.

I am aware that it is old and well known to provide friction gears which will yield if overloaded and also to provide safety fly wheels which will release themselves from a shaft if the latter should be stopped, but my invention is not intended or adapted for these purposes. I am also aware that it has been proposed, by flexibly connecting a band wheel to a driving shaft, to convert an irregular rotary motion of the driving shaft into a regular rotation of the wheel; but my invention is not intended or adapted to the conversion of irregular velocities into regular velocities and presupposes a prime mover having uniform velocity and a driving shaft which would be driven with uniform velocity by the prime mover if it were not for the tendency to irregular motion produced by the stresses and strains caused by the driven mechanism. My invention therefore, neither acts as a safety device nor tends to convert irregular velocity into regular velocity, but has for its object to prevent the tendency of the driven mechanism to react upon the driving shaft and produce vibrations in the driven mechanism.

Having now fully described my invention, what I claim and desire to protect by Letters Patent is:

1. Means for preventing vibrations in a rotary member actuating driven mechanism, comprising in combination with said member and means tending to rotate it with a constant velocity, a second rotary member constrained to travel at a constant velocity, and a frictional connection between the two members whereby any tendency of the first member to deviate from its normal velocity will be opposed by the friction between the two members and thereby tend to cause the velocity of the first member to be constant.

2. Means for preventing vibrations in a rotary member connected with driven mechanism, comprising in combination with said member and a prime mover tending to rotate it with a constant velocity, a second rotary member constrained to travel at a constant velocity and at the same normal angular velocity as the first member, the second member being arranged concentrically to the first member and in frictional driving relation therewith and adapted to oppose any tendency of the first member to vary its velocity from that of the prime mover and thereby acting to prevent or eliminate vibrations in the first member and the mechanism connected therewith.

3. Means for preventing vibrations in a rotary shaft comprising in combination with the shaft and means tending to rotate it with a constant velocity, a rotary member constrained to travel at a constant velocity, means connecting the rotary member with the shaft and having a frictional driving relation therewith and operative to oppose any tendency of the shaft to deviate from its normal velocity, thereby tending to prevent or eliminate vibrations therein.

4. Means for preventing vibration in a rotary element connected with driven mechanism, comprising in combination with a prime mover rotating at a constant velocity, two rotary elements one of which is the element first named and both of which are connected with the prime mover and adapted to be driven thereby at the same normal angular velocity, one of said rotary elements being a shaft on which the other rotary element is loosely sleeved, and members on the shaft non-rotatable relatively thereto and having surfaces in frictional engagement with the sleeved element, thereby tending to prevent variation from the normal in velocity of the first named rotary element.

5. Means for preventing vibration in a rotary element connected with driven mechanism, comprising in combination with a prime mover rotating at a constant velocity, two rotary elements one of which is the element first named and both of which are connected with the prime mover and adapted to be driven thereby at the same normal angular velocity, one of said rotary elements being a shaft on which the other rotary element is loosely sleeved, a member non-rotatable relatively to the shaft and frictionally engaging one side of the sleeved rotary element, and a second member non-rotatable, but axially adjustable, relatively to the shaft, and frictionally engaging the other side of the rotary element.

6. Means for preventing vibration in a rotary element connected with driven mechanism, comprising in combination with a prime mover rotating at a constant velocity, two rotary elements one of which is the element first named and both of which are connected with the prime mover and adapted to be driven thereby at the same normal angular velocity, one of said rotary elements being a shaft on which the other rotary element is loosely sleeved, a member non-rotatable relatively to the shaft and frictionally engaging one side of the sleeved rotary element, and a second member non-rotatable, but axially adjustable, relatively to the shaft and frictionally engaging the other side of the rotary element, a tension device acting against the axially movable member, and means for adjusting the movable member through the medium of the tension device.

7. Means for preventing vibrations in a rotary shaft comprising in combination with the shaft and a prime mover tending to rotate it with a constant velocity, a rotary member constrained to travel at a constant velocity and at the same normal angular velocity as the shaft, said rotary member being arranged concentric with the shaft and in frictional driving relation therewith and adapted to oppose any tendency of the shaft to vary its velocity from that imparted by the prime mover and thereby tending to prevent or eliminate vibrations therein.

8. Means for preventing vibrations in a rotary shaft comprising, in combination with the shaft and means tending to rotate it with a constant velocity, a rotary element constrained to travel at a constant velocity and at the same normal angular velocity as the shaft, and members on the shaft non-rotatable relatively thereto, said rotary element being loosely sleeved on the shaft between, and in frictional engagement with, said members, whereby variation in the velocity of the shaft from the normal is prevented.

9. Means for preventing vibration in a rotary member actuating driven mechanism comprising, in combination with the said member and means tending to rotate it with a constant velocity, a second rotary member and means positively driving it at a constant velocity, and a frictional connection between the two members whereby any tendency of the first member to deviate from its normal velocity will be opposed by the friction between the two members.

10. Means for preventing vibrations in a rotary shaft actuating driven mechanism comprising, in combination with the shaft and means tending to rotate it with a constant velocity, a rotary member arranged concentric with the shaft and means positively driving it at a constant velocity and at the same angular velocity as the shaft, and a frictional connection between the rotary member and shaft whereby any tendency of the shaft to deviate from its normal velocity will be opposed by the friction between the same and the rotary member.

In testimony of which invention, I have hereunto set my hand, at Philadelphia, on this 20th day of November, 1913.

LARS H. VOLD.

Witnesses:
 Jos. P. HAWTHORNE,
 COLEMAN SELLERS, Jr.